(12) United States Patent
Brorsson et al.

(10) Patent No.: US 10,097,002 B2
(45) Date of Patent: Oct. 9, 2018

(54) POWER TRANSMISSION ARRANGEMENT AND METHOD FOR OPERATING A POWER TRANSMISSION ARRANGEMENT

(71) Applicant: ABB SCHWEIZ AG, Baden (CH)

(72) Inventors: Göran Brorsson, Västerås (SE); Hongbo Jiang, Borlänge (SE); Marcin Szewczyk, Warsaw (PL); Mats Hyttinen, Ludvika (SE); Michal Lazarczyk, Cracow (PL); Pawel Dawidowski, Cracow (PL); Radoslaw Jez, Zory (PL); Wojciech Piasecki, Cracow (PL)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 15/735,714

(22) PCT Filed: Jun. 30, 2015

(86) PCT No.: PCT/EP2015/064871
§ 371 (c)(1),
(2) Date: Dec. 12, 2017

(87) PCT Pub. No.: WO2017/000994
PCT Pub. Date: Jan. 5, 2017

(65) Prior Publication Data
US 2018/0175622 A1    Jun. 21, 2018

(51) Int. Cl.
*H02M 5/42* (2006.01)
*H02J 3/36* (2006.01)
*H02M 5/44* (2006.01)

(52) U.S. Cl.
CPC ........ *H02J 3/36* (2013.01); *H02M 5/44* (2013.01)

(58) Field of Classification Search
CPC ............ H02M 5/40; H02M 5/42; H02M 5/45; H02M 5/453; H02M 5/458; H02J 3/36; H02J 3/38
See application file for complete search history.

(56) References Cited

U.S. PATENT DOCUMENTS 5,187,651 A * 2/1993 Ekstrom ............... H02J 3/36
363/35
5,644,482 A * 7/1997 Asplund ............... H02J 3/36
363/35
(Continued)

FOREIGN PATENT DOCUMENTS

CN    101252277 A    8/2008
CN    102983568 A    3/2013
(Continued)

OTHER PUBLICATIONS

International Preliminary Report on Patentability, issued in PCT/EP2015/064871, dated May 17, 2017.
(Continued)

*Primary Examiner* — Gary L Laxton
(74) *Attorney, Agent, or Firm* — Birch, Stewart, Kolasch & Birch, LLP

(57) ABSTRACT

Embodiments are generally based on employing a power transmission line in a HVDC link to provide auxiliary power to one of the ends of the HVDC link for facilitating a black start thereof when the HVDC link is de-energized, i.e. when at least one of the HVDC converter stations is de-energized and there is no transmission of power between inverter and rectifier HVDC converter stations on each side of the HVDC link. A relatively small amount of power can be conveyed towards one of the HVDC converter stations via the power transmission line so as to provide power to any auxiliary
(Continued)

system(s) of the converter station, for example prior to a black start of the converter station being carried out.

20 Claims, 4 Drawing Sheets

(56) References Cited

U.S. PATENT DOCUMENTS

| | | | | |
|---|---|---|---|---|
| 5,781,425 | A * | 7/1998 | Karlsson | H02J 3/38 |
| | | | | 323/207 |
| 5,867,375 | A * | 2/1999 | Svensson | H02J 3/36 |
| | | | | 363/35 |
| 2008/0197706 | A1 | 8/2008 | Nielsen | |
| 2010/0182809 | A1 * | 7/2010 | Cullinane | H02P 9/02 |
| | | | | 363/34 |
| 2012/0092904 | A1 * | 4/2012 | Nuqui | H02J 3/36 |
| | | | | 363/35 |
| 2013/0170255 | A1 * | 7/2013 | Mukherjee | H02J 3/36 |
| | | | | 363/35 |
| 2014/0268926 | A1 | 9/2014 | Gupta et al. | |

FOREIGN PATENT DOCUMENTS

| | | |
|---|---|---|
| EP | 2 325 970 A2 | 5/2011 |
| EP | 2 667 498 A2 | 11/2013 |
| EP | 2 869 419 A1 | 5/2015 |

OTHER PUBLICATIONS

International Search Report, issued in PCT/EP2015/064871, dated Feb. 23, 2016.
Written Opinion of the International Searching Authority, issued in PCT/EP2015/064871, dated Feb. 23, 2016.

* cited by examiner

_POWER TRANSMISSION ARRANGEMENT AND METHOD FOR OPERATING A POWER TRANSMISSION ARRANGEMENT_

TECHNICAL FIELD

The present invention generally relates to the field of power transmission systems, e.g. High Voltage Direct Current (HVDC) power transmission systems. Specifically, the present invention relates to a power transmission arrangement configured to electrically couple a first power system with a second power system, each of the first power system and the second power system for example comprising an alternating current (AC) and/or a direct current (DC) power system, by means of a power transmission line, e.g. comprising a DC transmission line.

BACKGROUND

HVDC power transmission has become increasingly important due to increasing need for power supply or delivery and interconnected power transmission and distribution systems. In a HVDC power system there is generally included an interface arrangement including or constituting a HVDC converter station, which is a type of station configured to convert high voltage DC to AC, or vice versa. A HVDC converter station may comprise a plurality of elements such as the converter itself (or a plurality of converters connected in series or in parallel), one or more transformers, capacitors, filters, and/or other auxiliary elements. Converters may comprise a plurality of solid-state based devices such as semiconductor devices and may be categorized as line-commutated converters (LCCs) or voltage source converters (VSCs), e.g. depending on the type of switches (or switching devices) which are employed in the converter. A plurality of solid-state semiconductor devices such as IGBTs may be connected together, for instance in series, to form a building block, or cell, of a HVDC converter.

HVDC Light is a technology developed by ABB and that is based on VSC technology and is designed to transmit power for example underground and underwater, and also over relatively long distances. HVDC Light based power systems may be capable of black start operation, i.e. they may have a capability of starting transferring power from an operating power system or grid to another power system or grid that suffered a blackout, or to an 'islanded' or isolated power system. A HVDC converter station is often equipped with auxiliary systems or elements such as systems which may provide or facilitate cooling, water purification, communications and/or control of operation of the HVDC converter station. It is often desired or even required that some or even all of such auxiliary systems should be operational before the actual black start of the HVDC link is performed. Prior to the black start of the HVDC link power is usually provided to such auxiliary systems by means of a diesel generator or the like. However, in some applications it may be disadvantageous or difficult or not feasible (or even impossible) to use diesel generators or the like. For example in case a HVDC converter station is located offshore, the use of diesel generators to provide its auxiliary systems with power prior to black start operation may be associated with relatively high costs relating to maintenance of the diesel generators. Use of diesel generators may also have a negative environmental impact due to need for storing fuel, etc. Also in a case where the HVDC converter station is located offshore, a dedicated AC transmission line for supplying auxiliary power to any auxiliary systems of the HVDC converter station may not be feasible for distances of more than a few hundred kilometers between the HVDC converter station to the shore due to relatively high reactive power consumption by the long capacitive cable that may be required for the AC transmission.

US 2014/0268926 A1 discloses a black start configuration that may be used with a HVDC transmission system including a HVDC conduit, which black start configuration comprises buck converters. According to US 2014/0268926 A1 a black start flow path can be formed, bypassing a transformer at the inverter side, HVDC inverter devices, HVDC rectifier devices and a transformer at the rectifier side, and directly coupling the buck converters with the HVDC conduit. However, there is still need in the art for an improved power transmission arrangement means for facilitating or enabling carrying out a black start of a HVDC link.

SUMMARY

In view of the above, a concern of the present invention is to provide means for facilitating or enabling carrying out a black start of a converter station of a power link, e.g. a DC link or a HVDC link, electrically connecting two power systems, e.g. two alternating current (AC) power systems.

A further concern of the present invention is to provide means for facilitating or enabling carrying out a black start of a converter station of a power link electrically connecting two power systems with less or even no need of a diesel generator or the like for providing power to any auxiliary systems of the converter station prior to the black start of the power link is carried out.

A further concern of the present invention is to provide means for facilitating or enabling carrying out a black start of a converter station of a power link electrically connecting two power systems with less or even no need of a dedicated AC power transmission line for supplying power to any auxiliary systems of the converter station prior to the black start of the power link is carried out.

To address at least one of these concerns and other concerns, a power transmission arrangement and a method of operating a power transmission arrangement in accordance with the independent claims are provided. Preferred embodiments are defined by the dependent claims.

According to a first aspect, there is provided a power transmission arrangement configured to electrically couple a first power system with a second power system. Each of the first power system and the second power system may for example comprise an alternating current (AC) and/or a direct current (DC) power system (e.g., a DC grid). The first power system and the second power system are electrically connected with a first converter station and a second converter station, respectively. Each of the first converter station and the second converter station is configured to convert AC power to DC power or vice versa. The power transmission arrangement comprises at least one power transmission line. The power transmission line may for example comprise a DC transmission line. In addition the power transmission line may be capable of conveying AC power. The first power system is selectively electrically connectable to one end of the power transmission line via the first converter station. The second power system is selectively electrically connectable to the other end of the power transmission line via the second converter station. The first converter station is arranged at the one end of the power transmission line. The second converter station is arranged at the other end of power transmission line. The power transmission arrangement comprises at least one electrical energy storage element that can be selectively charged or discharged, and is selectively electrically connectable to at least a portion of one of the first converter station and the second converter station such that the at least one electrical energy storage element when discharged can convey power to the at least a portion of the one of the first converter station and the second converter station. The power transmission arrangement comprises at least one auxiliary (power) converter that can be selectively electrically connected to the power transmission line and which is electrically connected to the at least one electrical energy storage element such that the at least one electrical energy storage element can be charged by power output from the at least one auxiliary converter. The power transmission arrangement is arranged and/or configured to convert power (e.g., AC power or DC power) from the one of the first power system and the second power system that is at the end of the power transmission line at which the other one of the first converter station and the second converter station is arranged, to DC and/or AC power, which DC or AC power has or is at a lower voltage than the nominal operating voltage of the other one of the first converter station and the second converter station. The power transmission arrangement is further arranged and/or configured to, possibly at least in part by way of an electrical switching arrangement, selectively cause the DC or AC power to be conveyed to the at least one auxiliary converter via the power transmission line when the one of the first converter station and the second converter station is de-energized, so as to charge the at least one electrical energy storage element. Thereby, power can be conveyed to the at least a portion of the one of the first converter station and the second converter station when it is de-energized, by discharging of the at least one electrical energy storage element. Thus, DC or AC power which may be lower than the nominal transmission power may be conveyed to the at least one auxiliary converter via the power transmission line.

The at least a portion of the one of the first converter station and the second converter station, to which power may be conveyed when it is de-energized by discharging of the at least one electrical energy storage element, may for example comprise auxiliary system(s) for implementing or realizing functionality of the respective converter station which is not directly related to power transferring and/or converting operations, such as for cooling, water purification, etc. In addition or in alternative the at least a portion of the one of the first converter station and the second converter station may for example comprise communications and/or control systems of (or associated with) the respective converter station.

In the context of the present application, by a converter station being de-energized it is meant that it is disconnected from a source of electricity such that it is not able to transmit power.

The at least one electrical energy storage element, or the at least one first electrical energy storage element and/or the at least one second electrical energy storage element as described further in the following, may for example comprise at least one battery or battery unit, a capacitor and/or a flywheel electrical energy storage, etc., and/or possibly another type of uninterruptible power supply (UPS), which may be a type of UPS as known in the art.

By the power transmission arrangement being configured to selectively cause DC or AC power to be conveyed to the at least one auxiliary converter via the power transmission line when the one of the first converter station and the second converter station is de-energized so as to charge the at least one electrical energy storage element, a power source that for example may be used prior to a black start of the one of the first converter station and the second converter station to provide power to e.g. any auxiliary system(s) thereof may be achieved. By conveying power to the at least a portion of the one of the first converter station and the second converter station when it is de-energized by discharging of the at least one electrical energy storage element, a black start of the one of the first converter station and the second converter station may be facilitated, since it is often desired or even required that some or even all of such auxiliary systems should be operational before a black start of a converter station is performed. The conveying of power to the at least a portion of the one of the first converter station and the second converter station when it is de-energized by discharging of the at least one electrical energy storage element may be carried out prior to carrying out a black start of the one of the first converter station and the second converter station.

Embodiments of the present invention are generally based on employing a power transmission line, e.g. a DC transmission line, in a HVDC link to provide auxiliary power to one of the ends of the HVDC link for facilitating a black start thereof when the HVDC link is de-energized, i.e. when at least one of the HVDC converter stations is de-energized and there is no 'transmission of power between inverter and rectifier HVDC converter stations (as it would be during 'normal' operation of the HVDC link) on each side of the HVDC link. A relatively small amount of power may be conveyed towards one of the HVDC converter stations via the power transmission line so as to provide power to any auxiliary system(s) of the converter station, for example prior to a black start of the converter station being carried out. Thus, the power transmission line may be used at significantly reduced voltage and current as compared to the voltage and current on the power transmission line during 'normal' operation of the HVDC link to provide power to any auxiliary system(s) of the converter station prior to a black start of the converter station being carried out. Thereby, black start of the converter station may be carried out with less or even no need of a diesel generator or the like, a dedicated AC power transmission line, etc., for providing power to the auxiliary system(s) of the converter station prior to the black start of the converter station being carried out. As mentioned in the foregoing, it is often desired or even required that some or even all of such auxiliary systems should be operational before the actual black start of the HVDC link is performed. By possibly being able to perform a black start of the HVDC link without need of diesel generators or the like, it may become easier or even be enabled to start up converter stations in remote, inaccessible locations (e.g., at subsea locations such as on the ocean floor). Furthermore costs may be reduced, since there may be no need for a diesel generator, and hence also no need for storing e.g. fuel for the diesel generator or for maintenance of the diesel generator.

Another way to generally describe embodiments of the present invention, is to use the power transmission line of a HVDC link for conveying power to a relatively small converter (in the context of the present application meaning having e.g. relatively low voltage and power ratings) at the HVDC inverter side of the HVDC link in order to provide power to an electrical energy storage element such as an UPS and any auxiliary system(s) of the HVDC inverter. That is to say (in the context of a HVDC power transmission system, is to derive relatively low voltage from the rectifier side of the HVDC link, for example by means of a relatively small auxiliary converter at the rectifier side of the HVDC link bypassing the HVDC rectifier, or from output of the HVDC rectifier in case it includes a multi-level converter, and transfer that voltage by means of the power transmission line of the HVDC link to charge an electrical energy storage element (e.g., an UPS) at the inverter side of the HVDC link. By "relatively low" voltage it is meant voltage that is low in comparison with voltage on the HVDC link during nominal (normal) operation thereof. Power stored in the electrical energy storage element can then fed to the HVDC inverter auxiliary system(s) for facilitating a black start of the HVDC inverter.

The at least one electrical energy storage element may be at least in part pre-charged before carrying out a black start of the one of the first converter station and the second converter station. That is to say, prior to initiating a black start operation for black starting the one of the first converter station and the second converter station, DC or AC power may be conveyed to the at least one auxiliary converter via the power transmission line when the one of the first converter station and the second converter station is de-energized, so as to charge the at least one electrical energy storage element. Then, in connection with performing a black start operation of the one of the first converter station and the second converter station, e.g., immediately before initiating the black start operation, power may be conveyed to the at least a portion of the one of the first converter station and the second converter station when it is de-energized, by discharging of the at least one electrical energy storage element.

Although embodiments of the present invention may be described herein in the context of a HVDC power transmission system, it is to be understood that the present invention is not limited to HVDC power transmission systems, but is applicable to all power transmission systems where power is transmitted between two power systems by way of a power transmission line.

In the context of the present application, by converting power (e.g., AC power or DC power) from the first power system and the second power system to DC or AC power, it is meant that power which has as a source the first power system or the second power system, respectively, and which may be directly or indirectly provided (e.g., by means of at least one transformer) from the first power system or the second power system, is converted to DC or AC power. Further in the context of the present application, by the DC or AC power having a lower voltage than the nominal operating voltage of the first converter station or the second converter station, it is meant that the DC or AC power has a voltage that is lower (possibly significantly) than a voltage at which the converter station is designed and/or desired or even required to operate. Thus, the DC or AC power may be at a voltage that corresponds to a fraction of the 'full' (or nominal) voltage on the power transmission line during 'normal' power transmission between the first and second converter stations via the power transmission line. Thereby, DC or AC current and voltage at a relatively low power (in comparison with 'normal' transmission of power between the first converter station and the second converter station) can be transferred to the at least one auxiliary converter via the power transmission line.

As will be further described in the following, DC or AC power having a lower voltage than the nominal operating voltage of the first converter station or the second converter station may for example be obtained by way of an auxiliary converter that bypasses the second converter station or the first converter station, respectively, and/or by way of the second converter station or the first converter station, respectively, comprising a modular multi-level converter (MMC) e.g. having or exhibiting a full-bridge or half-bridge configuration, and allowing for or facilitating outputting a fraction of its nominal operating voltage.

The voltage of the DC or AC power conveyed to the at least one auxiliary converter via the power transmission line may in general depend for example on the length of the at least one power transmission line, or the distance over which the DC or AC power must be conveyed in order to reach the at least one auxiliary converter, and/or the voltage of the second power system or the first power system. The longer the distance the lower the voltage rating of the at least one auxiliary converter may be. According to one or more embodiments of the present invention the voltage rating of the at least one auxiliary converter may be approximately 20-30% of the nominal voltage rating of the at least one power transmission line. This may be the case for example when the nominal voltage rating of the at least one power transmission line is between about 1 kV and 10 kV. However, for example in case the nominal voltage rating of the at least one power transmission line is relatively high, e.g. about 500 kV or even higher, the voltage rating of the at least one auxiliary converter may only be a few percent of the nominal voltage rating of the at least one power transmission line.

The electrical switching arrangement may comprise a plurality of switching elements or devices for example such as known in the art, e.g. comprising thyristors and/or transistors.

Although reference may be made herein to one power transmission line, it is to be understood that the power transmission arrangement may comprise a plurality of power transmission lines. The at least one power transmission line may for example comprise a HVDC transmission line, or several DC or HVDC transmission lines for example arranged in a grid. A HVDC transmission line may be arranged in configurations such as bi-pole, symmetric monopole, or monopole configuration. For example, a bipolar HVDC transmission line comprises a positive pole line, a negative pole line, and a metallic return line connected to ground. One or more embodiments of the present invention may for example be implemented in the positive pole line, the negative pole line, and/or in the metallic return line of a bipolar HVDC transmission line.

According to an embodiment of the present invention, the at least one power transmission line may comprise a plurality of power transmission lines or conductors, which plurality of power transmission lines or conductors may include a ground return, or a return line connected to ground. For the case where the at least one power transmission line comprises or is constituted by a bipolar HVDC transmission line, and in case there is a fault in one of the power transmission lines, e.g. in case there is a pole fault in one of the positive and negative poles, the current of the 'healthy' pole may be taken over by the ground return (or metallic return if available), and the faulty pole may be isolated. The DC or AC power may then be conveyed to the at least one auxiliary converter via the 'healthy' pole.

The at least one power transmission line may comprise an overhead line (OHL) or a cable. The at least one power transmission line may comprise at least one OHL portion and at least one cable portion.

The first converter station and/or the second converter station may for example include or be constituted by a HVDC converter station.

The first converter station and/or the second converter station may be based on VSC technology or LCC technology. In case the first converter station and/or the second converter station is based on LCC technology, power output from the at least one electrical storage element when discharged can be used to provide AC voltage to the AC side of the first converter station and/or the second converter station, respectively (possibly via a step-up transformer) for facilitating or enabling commutation of the (switching element(s)) of the first converter station and/or the second converter station, respectively, and thereby in turn facilitating or enabling black start of the first converter station and/or the second converter station, respectively.

The at least one auxiliary converter may be configured to convert DC power to AC power, or vice versa. For example, the at least one electrical energy storage element may possibly be charged by AC power output from the at least one auxiliary converter.

In alternative or in addition the at least one auxiliary converter may be configured to convert DC power to DC power, in case the at least a portion of the one of the first converter station and the second converter station is configured such that is capable of being fed or supplied with DC power.

In alternative or in addition, the at least one auxiliary converter may be configured to convert AC power to AC power, in case the power transmission line is capable of conveying AC power.

As mentioned in the foregoing, the voltage of the DC or AC power conveyed to the at least one auxiliary converter via the power transmission line may be smaller the longer the distance over which the DC or AC power must be conveyed in order to reach the at least one auxiliary converter or the higher the voltage of the second power system or the first power system.

According to one or more embodiments of the present invention, the power transmission arrangement may be configured to convert power (e.g., DC power or AC power) from the one of the first power system and the second power system that is at the end of the power transmission line at which the other one of the first converter station and the second converter station is arranged, to DC or AC power at a selected voltage. For example, the DC or AC power conveyed to the at least one auxiliary converter via the power transmission line when the one of the first converter station and the second converter station is de-energized may be controllable at least with respect to voltage level or magnitude.

As the skilled person will realize in the light of the disclosure herein there are several possibilities for realizing or implementing an arrangement and/or configuration of the power transmission arrangement, such that it becomes capable of converting power from the one of the first power system and the second power system that is at the end of the power transmission line at which the other one of the first converter station and the second converter station is arranged, to DC or AC power at a lower voltage than the nominal operating voltage of the other one of the first converter station and the second converter station, and so that the power transmission arrangement can selectively cause the DC or AC power to be conveyed to the at least one auxiliary converter via the power transmission line when the one of the first converter station and the second converter station is de-energized, so as to charge the at least one electrical energy storage element.

According to one embodiment of the present invention, the power transmission arrangement may comprise at least two auxiliary converters. One of the auxiliary converters may be selectively electrically connected to the power transmission line so as to selectively electrically bypass the first converter station (or second converter station). Another one of the auxiliary converters may be electrically connected to the at least one electrical energy storage element such that power output by the latter auxiliary converter can charge the at least one electrical energy storage element. Further, the one of the auxiliary converters may be selectively electrically connected to the power transmission line such that power output from the one of the auxiliary converters can be conveyed to the other one of the auxiliary converters via the power transmission line, when the other one of the auxiliary converters is electrically connected to the power transmission line.

According to one embodiment of the present invention, the power transmission arrangement may be arranged and/or configured to convert power from the second power system to DC or AC power at a selected voltage that is lower than the nominal operating voltage of the second converter station, and to selectively cause the DC or AC power to be conveyed to the at least one auxiliary converter via the power transmission line when the first converter station is de-energized, so as to charge the at least one electrical energy storage element. Power may thereby be conveyed to the at least a portion of the first converter station when it is de-energized, by discharging of the at least one electrical energy storage element. In that case, the one of the auxiliary converters may for example be electrically connected to the second power system via a dedicated transformer, and/or via a winding of a transformer electrically connected between the second converter station and the second power system. The dedicated transformer and/or the transformer which may be electrically connected between the second converter station and the second power system may down-convert voltage from the second power system.

In alternative or in addition, according to another embodiment of the present invention, the power transmission arrangement may be arranged and/or configured to convert power from the first power system to DC or AC power at a selected voltage that is lower than the nominal operating voltage of the first converter station, and to selectively cause the DC or AC power to be conveyed to the at least one auxiliary converter via the power transmission line when the second converter station is de-energized, so as to charge the at least one electrical energy storage element. Power may thereby be conveyed to the at least a portion of the second converter station when it is de-energized, by discharging of the at least one electrical energy storage element. In that case, the one of the auxiliary converters may for example be electrically connected to the first power system via a dedicated transformer, and/or via a winding of a transformer electrically connected between the first converter station and the first power system. The dedicated transformer and/or the transformer which may be electrically connected between the first converter station and the first power system may down-convert voltage from the first power system.

Another way of realizing or implementing an arrangement and/or configuration of the power transmission arrangement such that it becomes capable of converting power from the one of the first power system and the second power system that is at the end of the power transmission line at which the other one of the first converter station and the second converter station is arranged, to DC or AC power at a lower voltage than the nominal operating voltage of the other one of the first converter station and the second converter station, and so that it can selectively cause the DC or AC power to be conveyed to the at least one auxiliary converter via the power transmission line when the one of the first converter station and the second converter station is de-energized so as to charge the at least one electrical energy storage element, is by employing any controllability of voltage that may be exhibited by the other one of the first converter station and the second converter station.

For example, according to another embodiment of the present invention, one or both of the first converter station and the second converter station may comprise at least one modular multi-level converter (MMC) comprising a plurality of converter cells. One or both of the first converter station and the second converter station may thus be comprised in the power transmission arrangement. The at least one MMC may be configured to control its output voltage so as to output DC or AC power at a lower voltage than the nominal operating voltage of the other one of the first converter station and the second converter station, and input the DC or AC power into the power transmission line for conveyance of the DC or AC power to the at least one auxiliary converter via the power transmission line. The at least one MMC may for example comprise at least one half-bridge cell or a full-bridge cell. Hence, by way of an MMC, which may be controllable with respect to its output voltage, only a fraction or portion of voltage from the first power system or the second power system, respectively, may be 'transferred' to the power transmission line. For example, the at least one MMC may comprise at least one converter cell that can be selectively bypassed.

In alternative or in addition, at least one transformer may be electrically connected between the first converter station and the first power system and/or between the second converter station and the second power system, respectively. The at least one transformer may be configured to adjust voltage such that the at least one transformer outputs a selected fraction of the voltage of the first power system and/or the second power system, respectively. For achieving or implementing a voltage adjusting capability and/or capacity of the transformer, the transformer may for example be equipped with a tap changer mechanism such that by controllable selection of or switching between different transformer taps, the transformer's output voltage may be controlled or adjusted.

The at least one auxiliary converter may be electrically connected to the first power system or the second power system for example via a winding of the transformer, e.g. a tertiary winding thereof, or via another transformer which possibly may be dedicated to the at least one auxiliary converter. As known in the art, for example in high rating transformers, a transformer may have an additional winding in addition to a primary winding and a secondary winding. The additional winding may be referred to as a tertiary winding.

The power transmission arrangement may comprise a plurality of electrical energy storage elements. According to one or more embodiments of the present invention, the power transmission arrangement may comprise at least one first electrical energy storage element. The at least one first electrical energy storage element may be configured or arranged such that it can be selectively charged or discharged, and such that it can be selectively electrically connected to at least a portion of the first converter station such that the at least one first electrical energy storage element when discharged can convey power to the at least a portion of the first converter station. In alternative or in addition, the power transmission arrangement may comprise at least one second electrical energy storage element. The at least one second electrical energy storage element may be configured or arranged such that it can be selectively charged or discharged and such that it can be selectively electrically connected to at least a portion of the second converter station such that the at least one second electrical energy storage element when discharged can convey power to the at least a portion of the second converter station.

As indicated in the foregoing, the power transmission arrangement may comprise a plurality of auxiliary converters. According to one or more embodiments of the present invention, the power transmission arrangement may comprise at least one first auxiliary converter. The at least one first auxiliary converter may be selectively electrically connectable to the power transmission line, and may be electrically connected to the at least one first electrical energy storage element such that the at least one first electrical energy storage element can be charged by power output from the at least one first auxiliary converter. In alternative or in addition, the power transmission arrangement may comprise at least one second auxiliary converter. The at least one second auxiliary converter may be selectively electrically connectable to the power transmission line, and may be electrically connected to the at least one second electrical energy storage element such that the at least one second electrical energy storage element can be charged by power output from the at least one second auxiliary converter.

The power transmission arrangement may be configured to as to facilitate or enable black start of either one of the first converter station and the second converter station. That is to say, the black start operation may be 'bidirectional'. For example, according to one or more embodiments of the present invention, the power transmission arrangement may be configured to convert power from the second power system (e.g., DC or AC power) to DC or AC power at a lower voltage than the nominal operating voltage of the second converter station, and selectively cause the DC or AC power to be conveyed to the at least one first auxiliary converter via the power transmission line when the first converter station is de-energized so as to charge the at least one first electrical energy storage element, whereby power can be conveyed to the at least a portion of the first converter station when it is de-energized by discharging of the at least one first electrical energy storage element. And the power transmission arrangement may be further configured to convert power from the first power system (e.g., DC or AC power) to DC or AC power at a lower voltage than the nominal operating voltage of the first converter station, and selectively cause the DC or AC power to be conveyed to the at least one second auxiliary converter via the power transmission line when the second converter station is de-energized so as to charge the at least one second electrical energy storage element, whereby power can be conveyed to the at least a portion of the second converter station when it is de-energized by discharging of the at least one second electrical energy storage element.

According to a second aspect, there is provided a power transmission system which comprises a first power system, a second power system and a power transmission arrangement according to the first aspect configured to electrically couple the first power system with the second power system. Each of the first power system and the second power system may comprise an AC and/or a DC power system (e.g., a DC grid).

According to a third aspect, there is provided a method for operating a power transmission arrangement which is configured to electrically couple a first power system with a second power system. Each of the first power system and the second power system may for example comprise an AC and/or a DC power system (e.g., a DC grid). The first power system is electrically connected with a first converter station configured to convert AC power to DC power, or vice versa. The second power system is electrically connected with a second converter station configured to convert DC power to AC power, or vice versa. The power transmission arrangement comprises at least one power transmission line. The first power system is selectively electrically connectable to one end of the power transmission line via the first converter station. The second power system is selectively electrically connectable to the other end of the power transmission line via the second converter station. The first converter station is arranged at the one end of the power transmission line. The second converter station is arranged at the other end of power transmission line. The power transmission arrangement comprises at least one electrical energy storage element that can be selectively charged or discharged, and is selectively electrically connectable to at least a portion of one of the first converter station and the second converter station such that the at least one electrical energy storage element when discharged can convey power to the at least a portion of the one of the first converter station and the second converter station. The power transmission arrangement comprises at least one auxiliary (power) converter that can be selectively electrically connected to the power transmission line and which is electrically connected to the at least one electrical energy storage element such that the at least one electrical energy storage element can be charged by power output from the at least one auxiliary converter.

As per the method according to the third aspect, power (e.g., AC power or DC power) from the one of the first power system and the second power system that is at the end of the power transmission line at which the other one of the first converter station and the second converter station is arranged, is converted to DC and/or AC power at a lower voltage than the nominal operating voltage of the other one of the first converter station and the second converter station. The DC or AC power is conveyed to the at least one auxiliary converter via the power transmission line when the one of the first converter station and the second converter station is de-energized so as to charge the at least one electrical energy storage element, whereby power can be conveyed to the at least a portion of the one of the first converter station and the second converter station when it is de-energized by discharging of the at least one electrical energy storage element. Thus, power (e.g., DC power or AC power) which may be lower than the nominal transmission power may be conveyed to the at least one auxiliary converter via the power transmission line.

The method may comprise conveying power to the at least a portion of the one of the first converter station and the second converter station when it is de-energized by discharging of the at least one electrical energy storage element. The conveying of power to the at least a portion of the one of the first converter station and the second converter station when it is de-energized by discharging of the at least one electrical energy storage element may be carried out prior to carrying out a black start of the one of the first converter station and the second converter station. Thereby, the at least a portion of the one of the first converter station and the second converter station can be provided with power prior to black start of the converter station. That is to say, the at least one electrical energy storage element may be at least in part pre-charged with respect to carrying out a black start of the one of the first converter station and the second converter station. As mentioned in the foregoing, the at least a portion of the one of the first converter station and the second converter station may for example comprise auxiliary system(s) for example for implementing or realizing functionality of the converter station not directly related to power transferring and/or converting operations, such as for cooling, water purification, etc., and/or systems for controlling the converter station and/or for communications between the converter station and other entities in the power transmission arrangement or in the first or second power systems or another converter station.

At least the one of the first converter station and the second converter station may be line-commutated. Power output from the at least one electrical storage element when it is discharged may be used to provide AC voltage to the AC side of the first converter station or the second converter station, respectively, for commutation thereof.

According to one or more embodiments of the present invention, when the one of the first converter station and the second converter station has been energized, the at least a portion of the one of the first converter station and the second converter station may be powered (possibly solely) by means of power from the one of the first power system and the second power system that is at the end of the power transmission line at which the one of the first converter station and the second converter station is arranged.

Further objects and advantages of the present invention are described in the following by means of exemplifying embodiments. It is noted that the present invention relates to all possible combinations of features recited in the claims. Further features of, and advantages with, the present invention will become apparent when studying the appended claims and the description herein. Those skilled in the art realize that different features of the present invention can be combined to create embodiments other than those described herein.

BRIEF DESCRIPTION OF THE DRAWINGS

Exemplifying embodiments of the present invention will be described below with reference to the accompanying drawings.

All the figures are schematic, not necessarily to scale, and generally only show parts which are necessary in order to elucidate embodiments of the present invention, wherein other parts may be omitted or merely suggested.

DETAILED DESCRIPTION

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments are provided by way of example so that this disclosure will convey the scope of the present invention to those skilled in the art.

Figure 1:
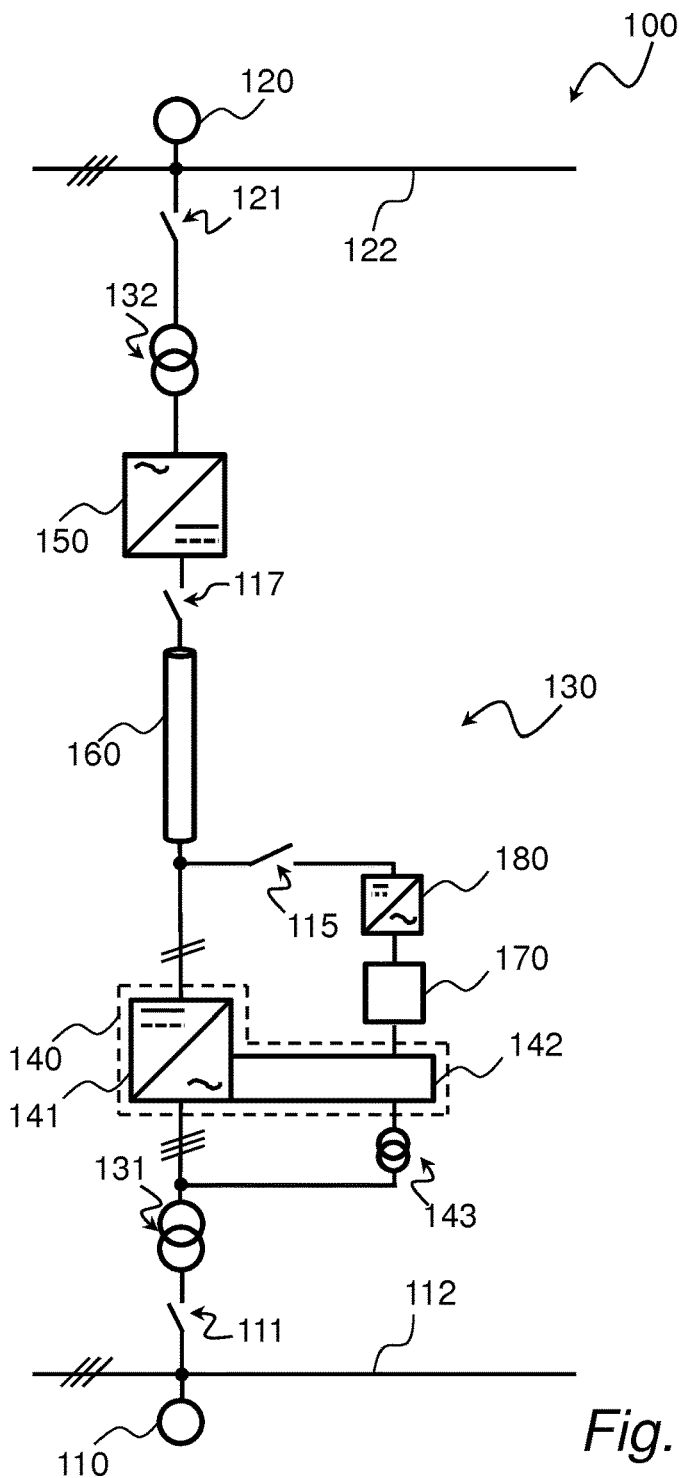
FIGS. 1-3 are schematic circuit diagrams of power transmission systems according to embodiments of the present invention.

FIG. 1 is a schematic circuit diagram of a power transmission system 100 according to an embodiment of the present invention. According to the embodiment of the present invention illustrated in FIG. 1 (and also in accordance with the embodiments of the present invention illustrated in FIGS. 2 and 3), the power transmission system 100 comprises a first power system 110 and a second power system 120, which first power system 110 and second power system 120 both are AC power systems. However, according to one or more embodiments of the present invention, at least one of the first power system 110 and the second power system 120 illustrated in FIGS. 1-3 may comprise a DC power system, e.g. a DC grid. In the following the first power system 110 and the second power system 120 may be referred to as a first AC power system 110 and a second AC power system 120, respectively. The power transmission system 100 comprises a power transmission arrangement 130 according to an embodiment of the present invention. The power transmission arrangement 130 is configured to electrically couple the first AC power system 110 with the second AC power system 120. The first AC power system 110 and the second AC power system 120 are electrically connected with the first converter station 140 and the second converter station 150, respectively, for example by way of AC buses or terminals 112 and 122, respectively. Each of the first converter station 140 and the second converter station 150 is configured to convert AC power to DC power or vice versa. The power transmission arrangement 130 comprises a power transmission line in the form of a DC transmission line 160 (or several DC transmission lines). It is to be understood that the power transmission line being a DC transmission line is according to an embodiment of the present invention, and that according to one or more embodiments of present invention, the power transmission line may be configured so as to be capable of conveying DC power and/or AC power. The DC transmission line 160 may comprise an OHL or a cable, or it may comprise at least one OHL portion and at least one cable portion. The first AC power system 110 is selectively electrically connectable (for example by way of a switching element or device 111 as illustrated in FIG. 1) to one end of the DC transmission line 160 via the first converter station 140, and the second AC power system 120 is selectively electrically connectable (for example by way of a switching element or device 121 as illustrated in FIG. 1) to the other end of the DC transmission line 160 via the second converter station 150. As illustrated in FIG. 1, the first converter station 140 is arranged at one end of the DC transmission line 160, and the second converter station 150 is arranged at the other end of the DC transmission line 160. In accordance with the embodiment of the present invention illustrated in FIG. 1, the second converter station 150 may be selectively electrically connected to the DC transmission line 160 for example by way of a switching element or device 117.

In accordance with the embodiment of the present invention illustrated in FIG. 1, and also in accordance with FIGS. 2 and 3 described in the following, the first converter station 140 and the second converter station 150 include or are constituted by HVDC converter stations, and the DC transmission line 160 is a HVDC transmission line. However, it is to be understood that the present invention is not limited to HVDC applications or HVDC power transmission systems, and that the present invention is applicable to power transmission systems in general where power is transmitted between two AC power systems by way of a DC transmission line.

The first converter station 140 comprises a first portion 141 configured to convert AC power to DC power or vice versa, and a second portion 142. The second portion 142 of the first converter station 140 may for example comprise auxiliary system(s) for implementing or realizing functionality of the first converter station 140 not directly related to power transferring and/or converting operations, such as for cooling, water purification, etc. In addition or in alternative the portion 142 of the first converter station 140 may for example comprise communications and/or control systems of (or associated with) the first converter station 140. The second converter station 150 may similarly to the first converter station 140 comprise a first portion and a second portion. However, only the portion of the second converter station 150 that is configured to convert AC power to DC power, or vice versa, is illustrated in FIG. 1.

The power transmission arrangement 130 comprises an electrical energy storage element 170 (or several electrical energy storage elements) that can be selectively charged or discharged. The electrical energy storage element 170 may for example comprise at least one battery or battery unit, a capacitor and/or a flywheel electrical energy storage, etc., and/or possibly another type of UPS, which may be a type of UPS as known in the art.

In accordance with the embodiment of the present invention illustrated in FIG. 1, the electrical energy storage element 170 is selectively electrically connectable to at least the portion 142 of the first converter station 140 such that the at least one electrical energy storage element 170 when discharged can convey power to (at least) the portion 142 of the first converter station 140.

The power transmission arrangement 130 comprises an auxiliary converter 180 (or several auxiliary converters). The auxiliary converter 180 can be selectively electrically connected to the DC transmission line 160 (for example by way of a switching element or device 115 as illustrated in FIG. 1). The auxiliary converter 180 is electrically connected to the electrical energy storage element 170 such that the electrical energy storage element 170 can be charged by power output from the auxiliary converter 180.

As illustrated in FIG. 1, the electrical energy storage element 170 may for example be selectively electrically connectable to the at least the portion 142 of the first converter station 140 by way of a switching element or device 115 (and further by way of the auxiliary converter 180).

As will be further described in the following, the power transmission arrangement 130 is configured to convert AC power from the second AC power system 120 to DC power at a lower voltage than the nominal operating voltage of the second converter station 150, and selectively cause the DC power to be conveyed to the auxiliary converter 180 via the DC transmission line 160 when the first converter station 140 is de-energized so as to charge the electrical energy storage element 170, whereby power can be conveyed to (at least) the portion 142 of the first converter station 140 when it is de-energized by discharging of the electrical energy storage element 170.

By conveying power to the portion 142 of the first converter station 140 when it is de-energized by discharging of the electrical energy storage element 170, a black start of the first converter station 140 may be facilitated. In this regard, it may, as indicated in the foregoing, be desired or even required that some or even all of any auxiliary systems of the (portion 142 of the) first converter station 140 should be operational before a black start of the first converter station 140 is performed.

Such a configuration of the power transmission arrangement 130 may be achieved in a number of different ways, such as described in the foregoing, and some of which will be further described in the following. It is however to be understood that other configurations of the power transmission arrangement 130 so that it can convert AC power from the second AC power system 120 to DC power at a lower voltage than the nominal operating voltage of the second converter station 150, and selectively cause the DC power to be conveyed to the auxiliary converter 180 via the DC transmission line 160 when the first converter station 140 is de-energized so as to charge the electrical energy storage element 170, are possible and within the scope of the present invention. According to one or more embodiments of the present invention, any controllability of voltage that may be exhibited by the second converter station 150 may be employed. For example, and in accordance with the embodiment of the present invention illustrated in FIG. 1, the second converter station 150 may comprise at least one MMC comprising a plurality of converter cells (not shown in FIG. 1). As known in the art, MMCs may be controllable with respect to output voltage. The at least one MMC may be configured to control its output voltage so as to output DC power at a lower voltage than the nominal operating voltage of the second converter station 150, and input the DC power into the DC transmission line 160 for conveyance of the DC power to the auxiliary converter 180 via the DC transmission line 160. The at least one MMC may for example comprise at least one half-bridge cell or a full-bridge cell. Hence, for example by way of an MMC, only a fraction or portion of voltage from the second AC power system 120 may be 'transferred' to the DC transmission line 160. For example, the at least one MMC may comprise at least one converter cell that can be selectively bypassed. The second converter station 150 may hence be comprised in the power transmission arrangement 130.

According to the embodiments of the present invention described with reference to FIGS. 1-3, the power which may be conveyed to the auxiliary converter 180 via the power transmission line 160 when the first converter station 140 is de-energized so as to charge the electrical energy storage element 170 is DC power. However, it is to be understood that the power transmission line 160 may be configured so as to be capable of conveying DC power and/or AC power, and that if the power transmission line 160 is capable of carrying AC power, the (auxiliary) power, which is conveyed to the auxiliary converter 180 via the power transmission line 160 when the first converter station 140 is de-energized so as to charge the electrical energy storage element 170, may be AC power.

According to the embodiment of the present invention illustrated in FIG. 1, a transformer 131 may be electrically connected between the first converter station 140 and the first AC power system 110. And further according to the embodiment of the present invention illustrated in FIG. 1, a transformer 132 may be electrically connected between the second converter station 150 and the second AC power system 120. And yet further according to the embodiment of the present invention illustrated in FIG. 1, a transformer 143 may be electrically connected between the portion 142 of the first converter station 140 and the first AC power system 110.

Each of the switching elements or devices 111, 115, 117, 121 may comprise a controllable switching element or device capable of controllably being switched on or off, or into an electrically conducting state or electrically non-conducting state (or substantially non-conducting state, where no or possibly only a relatively small current is allowed to flow via the respective switching element or device), respectively. Each of the switching elements or devices 111, 115, 117, 121 may for example comprise a mechanical contact system and/or a thyristor and/or a transistor.

Figure 2:
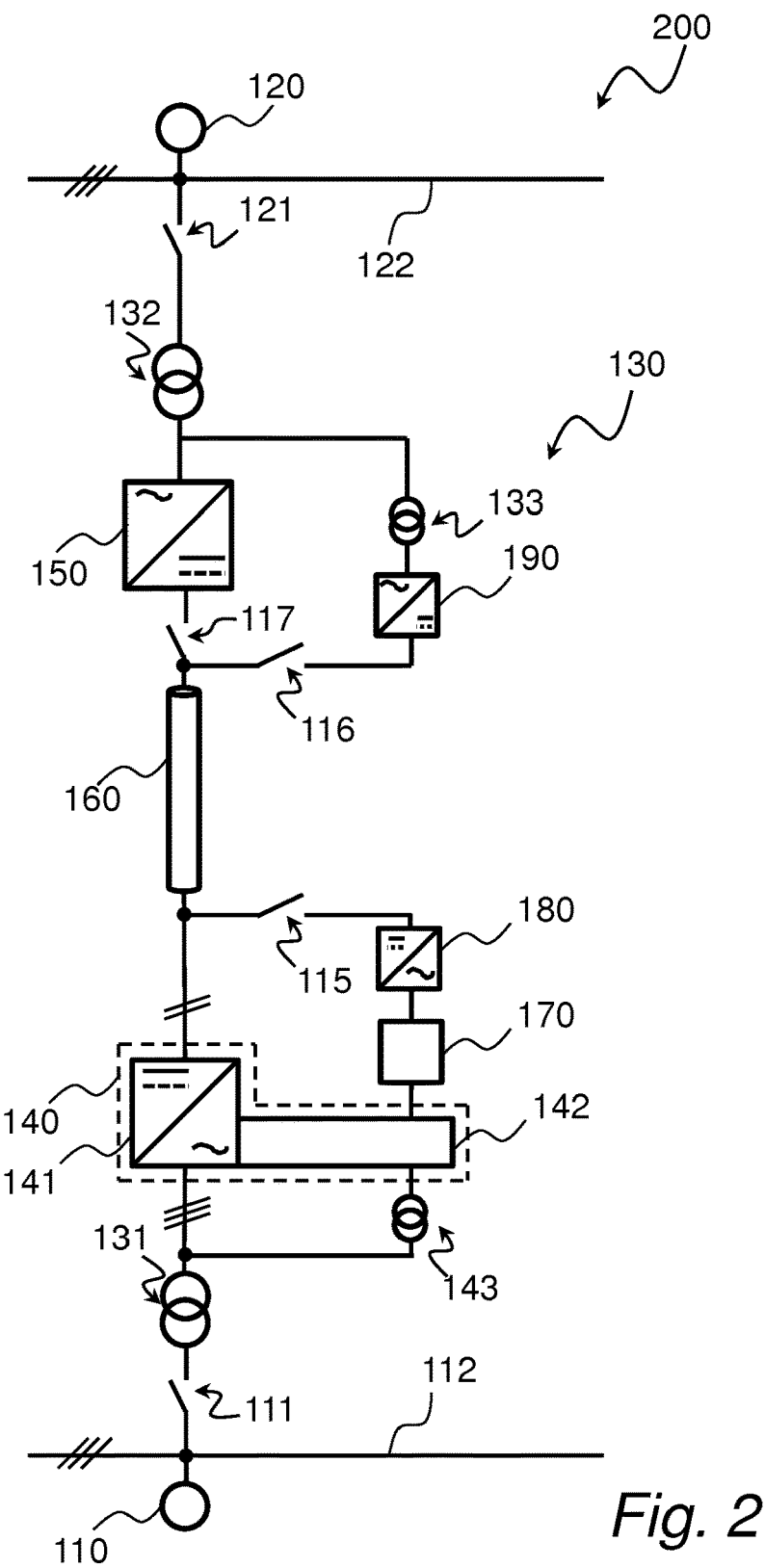
Figure 3:
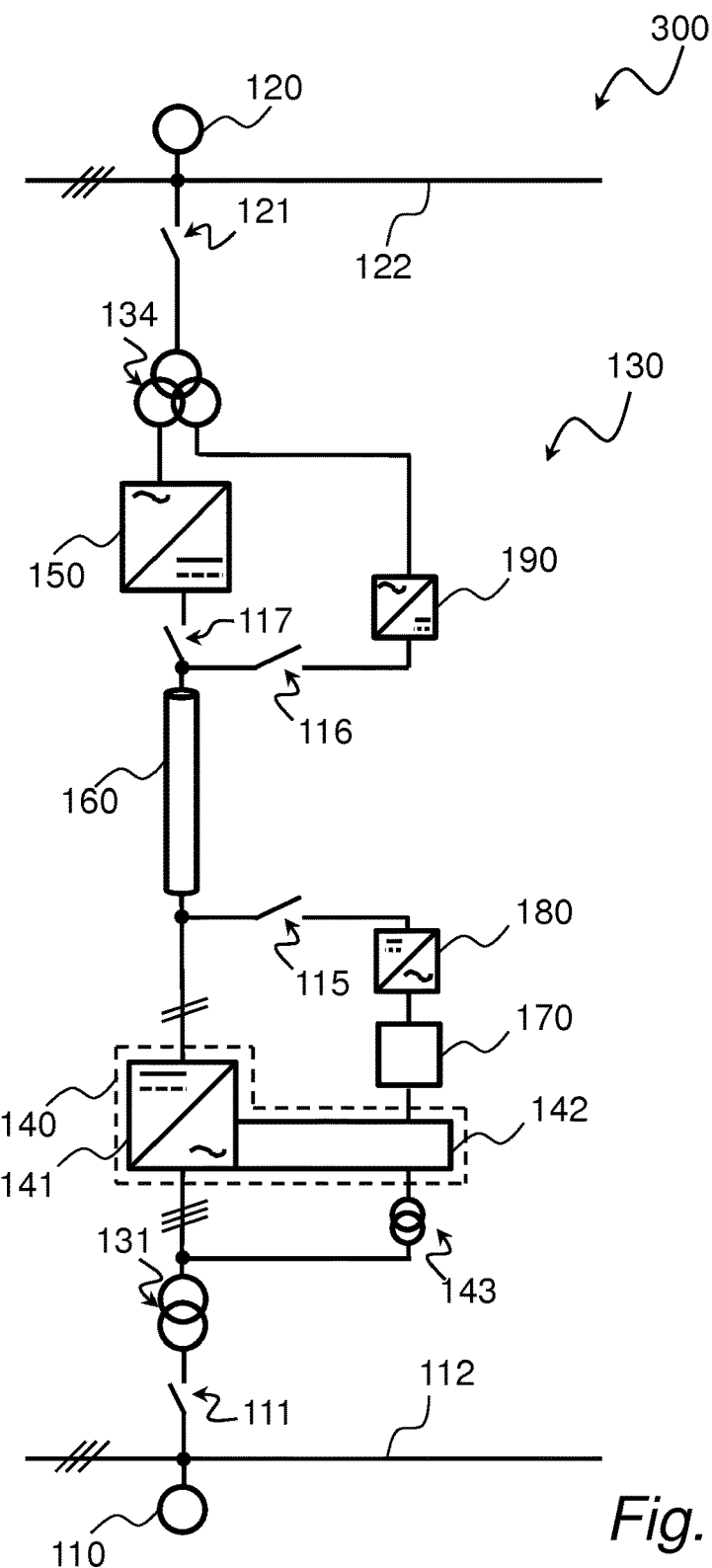

FIG. 2 is a schematic circuit diagram of a power transmission system 200 according to another embodiment of the present invention. The power transmission system 200 is similar to the power transmission system 100 illustrated in FIG. 1, and the same reference numerals in FIGS. 1 and 2 denote the same or similar components, and with the same or similar function, unless otherwise specified. As compared to the power transmission system 100 illustrated in FIG. 1, the power transmission system 200 illustrated in FIG. 2 comprises two auxiliary converters 180, 190. Similarly to as described in the foregoing with reference to FIG. 1, the auxiliary converter 180 can be selectively electrically connected to the DC transmission line 160 (for example by way of a switching element or device 115 as illustrated in FIG. 2). The auxiliary converter 180 is electrically connected to the electrical energy storage element 170 such that the electrical energy storage element 170 can be charged by power output from the auxiliary converter 180. The auxiliary converter 190 can be selectively electrically connected to the DC transmission line 160 (for example by way of a switching element or device 116 as illustrated in FIG. 2) so as to selectively electrically bypass the second converter station 150. The auxiliary converter 190 is configured to output DC power based on AC power that has been derived from a fraction of the voltage of the second AC power system 120.

The auxiliary converter 190 can be selectively electrically connected to the DC transmission line 160 such that power output from the auxiliary converter 190 can be conveyed to the auxiliary converter 180 via the DC transmission line 160 when the auxiliary converter 190 is electrically connected to the DC transmission line 160.

The switching element or device 116 may comprise a controllable switching element or device capable of controllably being switched on or off, or into an electrically conducting state or electrically non-conducting state (or substantially non-conducting state, where no or possibly only a relatively small current is allowed to flow via the respective switching element or device), respectively. The switching element or device 116 may for example comprise a mechanical contact system and/or a thyristor and/or a transistor.

According to the embodiment of the present invention illustrated in FIG. 2, the transformer 132 may be configured to adjust voltage from the second power system 120 such that transformer 132 outputs a selected fraction of the voltage of the second AC power system 120. To that end, the transformer 132 may for example be equipped with a tap changer mechanism such that by controllable selection of or switching between different transformer taps, the transformer's 132 output voltage may be controlled or adjusted. As illustrated in FIG. 2, the auxiliary converter 190 may be electrically connected to the second AC power system 120 for example via a transformer 133, which possibly may be dedicated to the auxiliary converter 190.

In alternative (or in addition) to the transformer 133, the auxiliary converter 190 may be electrically connected to the second AC power system 120 via an additional winding of the transformer 132, which the transformer 132 may have in addition to a primary winding and a secondary winding. The additional winding of the transformer 132 may hence be a tertiary winding. This case is illustrated in FIG. 3, which is a schematic circuit diagram of a power transmission system 300 according to another embodiment of the present invention. The power transmission system 300 is similar to the power transmission system 200 illustrated in FIG. 2, and the same reference numerals in FIGS. 2 and 3 denote the same or similar components, and with the same or similar function. As compared to the power transmission system 200 illustrated in FIG. 2, the power transmission system 300 illustrated in FIG. 3 comprises a transformer 134 electrically connected between the second converter station 150 and the second AC power system 120. The transformer 134 may be configured to adjust voltage from the second power system 120 such that transformer 134 outputs a selected fraction of the voltage of the second AC power system 120. To that end, the transformer 134 may for example be equipped with a tap changer mechanism such that by controllable selection of or switching between different transformer taps, the transformer's 134 output voltage may be controlled or adjusted. As illustrated in FIG. 3, the auxiliary converter 190 may be electrically connected to the second AC power system 120 via an additional winding of the transformer 134, which the transformer 134 may have in addition to a primary winding and a secondary winding.

As described in the foregoing, by way of the configuration of the power transmission arrangement 130 so as to be able to convey power to (at least) the portion 142 of the first converter station 140 when it is de-energized, by discharging of the electrical energy storage element 170, a black start of the first converter station 140 may be facilitated. The conveying of power to the portion 142 of the first converter station 140 when it is de-energized may be carried out prior to carrying out a black start of the first converter station 140.

An exemplifying procedure for performing a black start of the first converter station 140 will now be described with reference to FIG. 2. The procedure may be divided into stages such as described in the following.

The switching elements or devices 111 and 121 may be switched on so that each of them enters an electrically conducting state at all times or substantially at all times.

At a first stage, the first converter station 140 is de-energized. The switching element or device 117 may be switched off so that it is in an electrically non-conducting state. The second converter station 150 is energized, but is not transmitting power to the first converter station 140. The switching elements or devices 115 and 116 are switched on so that each of them is in an electrically conducting state. Power from the second power system 120 then flows by way of transformers 133 and 132 and the auxiliary converter 190 into the DC transmission line 160, and via the auxiliary converter 190 to the electrical energy storage element 170, thereby charging it.

At a second stage, once the electrical energy storage element 170 has been at least in part charged or fully charged, power may be conveyed to the portion 142 of the first converter station 140, by discharging of the electrical energy storage element 170.

At a third stage, the switching elements or devices 115 and 116 are switched off so that each of them is in an electrically non-conducting state. At this stage, no power may flow via the DC transmission line 160. The portion 142 of the first converter station 140 may now be energized and ready for operation. In alternative, the portion 142 of the first converter station 140 may be energized during the second stage, in which case the required capacity (or 'size') of the electrical energy storage element 170 may be less than if the portion 142 of the first converter station 140 is energized during the third stage. Both of the first and second auxiliary converters 180, 190 may be shut down. The first converter station 140 (possibly the portion 142) may transmit a signal or message to the second converter station 150 indicating that the portion 142 of the first converter station 140 has been charged. The transmission of the signal or message may for example be carried out by way of a communication module (not shown in FIG. 2), which may be comprised in the power transmission arrangement 130. The communication module may be based on wired and/or wireless communication technique(s) as known in the art. The switching of the switching elements or devices 115 and 116 into electrically non-conducting states, and possibly also the shutting down of the first and second auxiliary converters 180, 190, may in turn be carried out responsive to the switching elements or devices 115 and 116 and possibly the first and second auxiliary converters 180, 190 receiving a signal or message from the second converter station 150, which signal or message may be transmitted once the second converter station 150 is ready to transmit power. Power to the portion 142 of the first converter station 140 is provided from the electrical energy storage element 170. Any initialization of the first converter station 140 before energizing it may, if required, be carried out. In addition to any power from the electrical energy storage element 170 by discharging thereof, power may be conveyed to the portion 142 of the first converter station 140 also from the first AC power system 110 by way of transformer 143.

At a fourth stage, once both of the switching elements or devices 115 and 116 are deemed or confirmed to be switched off, the second converter station 150 may initiate power transmission from the second converter station 150 to the first converter station 140 via the DC transmission line 160 at the nominal operating voltage on the DC transmission line during 'normal' power transmission. The switching element or device 117 is switched on so that it is in an electrically conducting state, thus energizing the first converter station 140. Also at this stage, power may be conveyed to the portion 142 of the first converter station 140 from the first AC power system 110 by way of transformer 143, as well as from the electrical energy storage element 170 by discharging thereof. The switching element or device 115 and/or 116 (or another one of the switching elements or devices illustrated in FIGS. 1 to 3) can be deemed or confirmed to be switched off for example after a predefined period of time has elapsed since the signal or message from the second converter station 150 to the switching element or device 115 and/or 116 was transmitted.

At a fifth stage, the first converter station 140 is energized and is transmitting power to the second converter station 150. At this stage, the portion 142 of the first converter station 140 may optionally be powered for example by means of first AC power system 110 by way of transformer 143, possibly with no power being conveyed to the portion 142 of the first converter station 140 from the electrical energy storage element 170. This may be useful for example in case of a black start of a HVDC link of an off-shore wind power plant from an on-shore converter station As indicated in the foregoing, any one of the power transmission arrangements 130 described in the foregoing may be configured to as to facilitate or enable black start of either one of the first converter station 140 and the second converter station 150. That is to say, the black start operation may be 'bidirectional'. To this end, the power transmission arrangement 130 may as described in the foregoing comprise a plurality of electrical energy storage elements (not shown in FIGS. 1-3, each of which depicts the exemplifying case where there is one electrical energy storage element 170). Each of the first and second converter stations 140, 150 may be associated with at least one electrical energy storage element, similarly or the same as to how the electrical energy storage element 170 is associated with the first converter station 140. Black start operation in either direction (i.e. black start of either the first converter station 140 or the second converter station 150) may for example be carried out in the same or similar manner as described above with reference to FIG. 2. A switching element or device (not shown in the figures) may be provided for selectively electrically connecting the first converter station 140 to the DC transmission line 160, similarly to the switching element or device 117, by way of which switching element or device 117 the second converter station 150 can be selectively electrically connected to the DC transmission line 160. The switching element or devices may be controlled for example by way of a message, signaling, etc., transmitted from the first or second converter station 140, 150 at the other end of the DC transmission line 160—that is to say, from the one of the first and second converter station 140, 150 that acts as 'transmitting' converter station during the black start operation.

As indicated in the foregoing, the power transmission line 160 may be configured so as to be capable of conveying DC power and/or AC power. If the power transmission line 160 is capable of conveying AC power, the (auxiliary) power, which is conveyed to the auxiliary converter 180 via the power transmission line 160 when the first converter station 140 is de-energized so as to charge the electrical energy storage element 170, may be AC power. In that case, the auxiliary converter 180 may be an AC/AC converter, instead of an AC/DC converter or possibly DC/DC converter. With reference to the embodiments illustrated in FIGS. 2 and 3, the auxiliary converter 190 may in that case be an AC/AC converter instead of an AC/DC converter.

Figure 4:
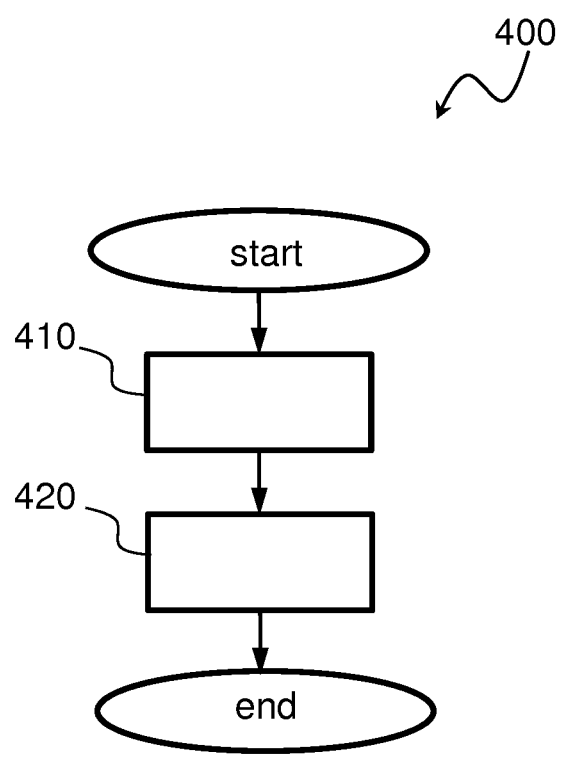
FIG. 4 is a schematic flowchart illustrating a method for operating a power transmission arrangement according to an embodiment of the present invention.

FIG. 4 is a schematic flowchart illustrating a method 400 for operating a power transmission arrangement according to an embodiment of the present invention. The power transmission arrangement is configured to electrically couple a first power system with a second power system. The first power system may comprise an AC power system and/or a DC power system. The second power system may comprise an AC power system and/or a DC power system. The first power system is electrically connected with a first converter station configured to convert AC power to DC power, or vice versa. The second power system is electrically connected with a second converter station configured to convert DC power to AC power, or vice versa. The power transmission arrangement comprises at least one power transmission line. The first power system is selectively electrically connectable to one end of the power transmission line via the first converter station. The second power system is selectively electrically connectable to the other end of the power transmission line via the second converter station. The first converter station is arranged at the one end of the power transmission line. The second converter station is arranged at the other end of power transmission line. The power transmission arrangement comprises at least one electrical energy storage element that can be selectively charged or discharged, and is selectively electrically connectable to at least a portion of one of the first converter station and the second converter station such that the at least one electrical energy storage element when discharged can convey power to the at least a portion of the one of the first converter station and the second converter station. The power transmission arrangement comprises at least one auxiliary (power) converter that can be selectively electrically connected to the power transmission line and which is electrically connected to the at least one electrical energy storage element such that the at least one electrical energy storage element can be charged by power output from the at least one auxiliary converter.

The method 400 comprises converting power (e.g., AC power or DC power) from the one of the first power system and the second power system that is at the end of the power transmission line at which the other one of the first converter station and the second converter station is arranged, to DC or AC power, 410, which DC or AC power is at a lower voltage than the nominal operating voltage of the other one of the first converter station and the second converter station.

The DC or AC power is conveyed to the at least one auxiliary converter via the power transmission line when the one of the first converter station and the second converter station is de-energized, so as to charge the at least one electrical energy storage element, 420. Thereby power can be conveyed to the at least a portion of the one of the first converter station and the second converter station when it is de-energized by discharging of the at least one electrical energy storage element.

While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A power transmission arrangement configured to electrically couple a first power system with a second power system, the first power system and the second power system being electrically connected with a first converter station and a second converter station, respectively, each of the first converter station and the second converter station being configured to convert AC power to DC power or vice versa, the power transmission arrangement comprising:
at least one power transmission line, wherein the first power system is selectively electrically connectable to one end of the power transmission line via the first converter station and the second power system is selectively electrically connectable to the other end of the power transmission line via the second converter station, wherein the first converter station is arranged at the one end of the power transmission line and the second converter station is arranged at the other end of power transmission line;
at least one electrical energy storage element that can be selectively charged or discharged and is selectively electrically connectable to at least a portion of one of the first converter station and the second converter station such that the at least one electrical energy storage element when discharged can convey power to the at least a portion of the one of the first converter station and the second converter station; and
at least one auxiliary converter that can be selectively electrically connected to the power transmission line and which is electrically connected to the at least one electrical energy storage element such that the at least one electrical energy storage element can be charged by power output from the at least one auxiliary converter, wherein the power transmission arrangement is configured to convert power from the one of the first power system and the second power system that is at the end of the power transmission line at which the other one of the first converter station and the second converter station is arranged, to DC or AC power at a lower voltage than the nominal operating voltage of the other one of the first converter station and the second converter station, and selectively cause the DC or AC power to be conveyed to the at least one auxiliary converter via the power transmission line when the one of the first converter station and the second converter station is de-energized so as to charge the at least one electrical energy storage element, whereby power can be conveyed to the at least a portion of the one of the first converter station and the second converter station when it is de-energized by discharging of the at least one electrical energy storage element.

2. The power transmission arrangement according to claim 1, wherein the power transmission arrangement is configured to convert power from the one of the first power system and the second power system that is at the end of the power transmission line at which the other one of the first converter station and the second converter station is arranged, to DC or AC power at a selected voltage.

3. The power transmission arrangement according to claim 1, comprising at least two auxiliary converters;
   wherein one of the auxiliary converters can be selectively electrically connected to the power transmission line so as to selectively electrically bypass the other one of the first converter station and the second converter station;
   wherein another one of the auxiliary converters is electrically connected to the at least one electrical energy storage element such that power output by said auxiliary converter can charge the at least one electrical energy storage element; and
   wherein the one of the auxiliary converters can be selectively electrically connected to the power transmission line such that power output from said auxiliary converter can be conveyed to the other one of the auxiliary converters via the power transmission line when the other one of the auxiliary converters is electrically connected to the power transmission line.

4. The power transmission arrangement according to claim 1, further comprising the other one of the first converter station and the second converter station, and wherein the other one of the first converter station and the second converter station comprises at least one modular multi-level converter, MMC, comprising a plurality of converter cells, and wherein the at least one MMC is configured to control its output voltage so as to output DC or AC power at a lower voltage than the nominal operating voltage of the other one of the first converter station and the second converter station and input the DC or AC power into the power transmission line for conveyance of the DC or AC power to the at least one auxiliary converter via the power transmission line.

5. The power transmission arrangement according to claim 4, wherein the at least one MMC comprises at least one half-bridge cell or a full-bridge cell.

6. The power transmission arrangement according to claim 4, further comprising:
   at least one transformer electrically connected between the other one of the first converter station and the second converter station and the first power system or the second power system, respectively, wherein the transformer is configured to adjust voltage such that the at least one transformer outputs a selected fraction of the voltage of the second power system or the first power system, respectively.

7. The power transmission arrangement according to claim 4, wherein the at least one MMC comprises at least one converter cell that can be selectively bypassed.

8. The power transmission arrangement according to claim 1, comprising:
   at least one first electrical energy storage element that can be selectively charged or discharged and which can be selectively electrically connected to at least a portion of the first converter station such that the at least one first electrical energy storage element when discharged can convey power to the at least a portion of the first converter station;
   at least one second electrical energy storage element that can be selectively charged or discharged and which can be selectively electrically connected to at least a portion of the second converter station such that the at least one second electrical energy storage element when discharged can convey power to the at least a portion of the second converter station; and
   at least one first auxiliary converter that can be selectively electrically connected to the power transmission line and which is electrically connected to the at least one first electrical energy storage element such that the at least one first electrical energy storage element can be charged by power output from the at least one first auxiliary converter;
   at least one second auxiliary converter that can be selectively electrically connected to the power transmission line and which is electrically connected to the at least one second electrical energy storage element such that the at least one second electrical energy storage element can be charged by power output from the at least one second auxiliary converter;
   wherein the power transmission arrangement is configured to convert power from the second power system to DC or AC power at a lower voltage than the nominal operating voltage of the second converter station, and selectively cause the DC or AC power to be conveyed to the at least one first auxiliary converter via the power transmission line when the first converter station is de-energized so as to charge the at least one first electrical energy storage element, whereby power can be conveyed to the at least a portion of the first converter station when it is de-energized by discharging of the at least one first electrical energy storage element; and
   wherein the power transmission arrangement is configured to convert power from the first power system to DC or AC power at a lower voltage than the nominal operating voltage of the first converter station, and selectively cause the DC or AC power to be conveyed to the at least one second auxiliary converter via the power transmission line when the second converter station is de-energized so as to charge the at least one second electrical energy storage element, whereby power can be conveyed to the at least a portion of the second converter station when it is de-energized by discharging of the at least one second electrical energy storage element.

9. A power transmission system comprising:
a first power system;
a second power system; and
the power transmission arrangement according to claim 1 configured to electrically couple the first power system with the second power system.

10. The power transmission system according to claim 9, wherein the first power system and/or the second power system comprises an AC power system and/or a DC power system.

11. A method for operating a power transmission arrangement configured to electrically couple a first power system with a second power system, the first power system being electrically connected with a first converter station configured to convert AC power to DC power, or vice versa, and the second power system being electrically connected with a second converter station configured to convert DC power to AC power, or vice versa, the power transmission arrangement comprising:
   at least one power transmission line, wherein the first power system is selectively electrically connectable to one end of the power transmission line via the first converter station and the second power system is selectively electrically connectable to the other end of the power transmission line via the second converter station, wherein the first converter station is arranged at the one end of the power transmission line and the second converter station is arranged at the other end of power transmission line;
   at least one electrical energy storage element that can be selectively charged or discharged and is selectively electrically connectable to at least a portion of one of the first converter station and the second converter station such that the at least one electrical energy storage element when discharged can convey power to the at least a portion of the one of the first converter station and the second converter station; and
   at least one auxiliary converter that can be selectively electrically connected to the power transmission line and which is electrically connected to the at least one electrical energy storage element such that the at least one electrical energy storage element can be charged by power output from the at least one auxiliary converter;
the method comprising:
   converting power from the one of the first power system and the second power system that is at the end of the power transmission line at which the other one of the first converter station and the second converter station is arranged, to DC or AC power at a lower voltage than the nominal operating voltage of the other one of the first converter station and the second converter station; and
   conveying the DC or AC power to the at least one auxiliary converter via the power transmission line when the one of the first converter station and the second converter station is de-energized so as to charge the at least one electrical energy storage element, whereby power can be conveyed to the at least a portion of the one of the first converter station and the second converter station when it is de-energized by discharging of the at least one electrical energy storage element.

12. The method according to claim 11, further comprising:
   conveying power to the at least a portion of the one of the first converter station and the second converter station when it is de-energized by discharging of the at least one electrical energy storage element.

13. The method according to claim 12, wherein the conveying of power to the at least a portion of the one of the first converter station and the second converter station when it is de-energized by discharging of the at least one electrical energy storage element is carried out prior to carrying out a black start of the one of the first converter station and the second converter station.

14. The method according to claim 11, wherein at least the one of the first converter station and the second converter station is line-commutated, and wherein the method further comprises:
   using power output from the at least one electrical storage element when it is discharged to provide AC voltage to the AC side of the first converter station or the second converter station, respectively, for commutation thereof.

15. The method according to claim 11, wherein when the one of the first converter station and the second converter station has been energized, the at least a portion of the one of the first converter station and the second converter station is powered by means of power from the one of the first power system and the second power system that is at the end of the power transmission line at which the one of the first converter station and the second converter station is arranged.

16. The power transmission arrangement according to claim 2, comprising at least two auxiliary converters;
   wherein one of the auxiliary converters can be selectively electrically connected to the power transmission line so as to selectively electrically bypass the other one of the first converter station and the second converter station;
   wherein another one of the auxiliary converters is electrically connected to the at least one electrical energy storage element such that power output by said auxiliary converter can charge the at least one electrical energy storage element; and
   wherein the one of the auxiliary converters can be selectively electrically connected to the power transmission line such that power output from said auxiliary converter can be conveyed to the other one of the auxiliary converters via the power transmission line when the other one of the auxiliary converters is electrically connected to the power transmission line.

17. The power transmission arrangement according to claim 2, further comprising the other one of the first converter station and the second converter station, and wherein the other one of the first converter station and the second converter station comprises at least one modular multi-level converter, MMC, comprising a plurality of converter cells, and wherein the at least one MMC is configured to control its output voltage so as to output DC or AC power at a lower voltage than the nominal operating voltage of the other one of the first converter station and the second converter station and input the DC or AC power into the power transmission line for conveyance of the DC or AC power to the at least one auxiliary converter via the power transmission line.

18. The power transmission arrangement according to claim 5, further comprising:
   at least one transformer electrically connected between the other one of the first converter station and the second converter station and the first power system or the second power system, respectively, wherein the transformer is configured to adjust voltage such that the at least one transformer outputs a selected fraction of the voltage of the second power system or the first power system, respectively.

19. The power transmission arrangement according to claim 5, wherein the at least one MMC comprises at least one converter cell that can be selectively bypassed.

20. The power transmission arrangement according to claim 6, wherein the at least one MMC comprises at least one converter cell that can be selectively bypassed.

\* \* \* \* \*